United States Patent [19]

Knutson

[11] 4,132,810

[45] Jan. 2, 1979

[54] PROCESS FOR PREPARING FABRICATED BACON

[75] Inventor: Richard K. Knutson, Minneapolis, Minn.

[73] Assignee: General Mills, Inc., Minneapolis, Minn.

[21] Appl. No.: 810,553

[22] Filed: Jun. 24, 1977

[51] Int. Cl.² ............................................. A23L 1/31
[52] U.S. Cl. ................................... 426/104; 426/438; 426/646; 426/802
[58] Field of Search ............... 426/249, 104, 646, 802, 426/438, 249, 104, 646, 802

[56] References Cited

U.S. PATENT DOCUMENTS

| | | | |
|---|---|---|---|
| 3,765,902 | 10/1973 | Charter | 426/249 |
| 3,897,572 | 7/1975 | Riggs et al. | 426/104 X |
| 3,999,474 | 12/1976 | Sienkiewicz et al. | 426/104 X |

*Primary Examiner*—Raymond N. Jones
*Assistant Examiner*—Elizabeth A. Hatcher
*Attorney, Agent, or Firm*—Gene O. Enockson

[57] ABSTRACT

The present invention describes a fabricated bacon product made primarily from comminuted meat and comprises a lean portion and a white portion. The product prepared by the present invention excellently simulates the taste, appearance and cooking characteristics of real bacon.

17 Claims, No Drawings

PROCESS FOR PREPARING FABRICATED BACON

BACKGROUND OF THE INVENTION

1. Field of the Invention

The present invention describes the preparation of back substitute products.

2. Description of the Art

Over the course of several years many attempts have been made to prepare tasty substitutes for meat products. These efforts have been made due to the combined forces of scarcity and the high cost of the meat. Soy beans have frequently been touted as an excellent source of protein and hence an excellent starting material for meat substitutes. For instance, U.S. Pat. No. 3,999,474 issued Dec. 28, 1976 to Sienkiewicz et al., describes an apparatus for making simulated meat products containing vegetable protein such as soy isolate. Other meat substitute products have been formed from strands of alginates as described in U.S. Pat. No. 3,627,536 issued to Arima et al. Dec. 14, 1971. Sources of protein for meat analogs include fish flour as described in U.S. Pat. No. 3,047,395 issued to Rusoff et al. July 31, 1962, and beef by-products as described in U.S. Pat. No. 3,890,451 issued to Keszler June 17, 1975.

Albumin or eggs have also been suggested as a protein source for meat analog products. In this regard, see Canadian Pat. No. 872,186 issued June. 1, 1971 to Rispoli et al., as well as U.S. Pat. Nos. 3,320,070 and 3,840,677 issued respectively May 16, 1967 and Oct. 8, 1974 to Hartman and Leidy et al. The Canadian patent brings into vogue the possibility that a bacon and eggs breakfast will in fact be an eggs and eggs breakfast. While the foregoing breakfast menu may appear humorous, it must be considered that such a human dietary intake could present problems for persons having a known allergy to eggs. That is, while eggs are an excellent source of protein, their use in significant quantities in a meat analog restricts consumption to a large number of persons with such allergies.

A severe problem in manufacturing any simulated meat product and in particular a simulated bacon product is the taste of the product. For instance, pork flavoring by hog fat in a simulated bacon product using as a major source of protein, soy beans, is described in Canadian Pat. No. 536,911 issued to Schultz on Feb. 5, 1957. As previously mentioned soy does provide an excellent source of protein, however, when soy is used as the predominate protein in any product the unpleasant taste to one degree or another of the soy beans always comes through. Thus, until the problem of making soy beans taste other than soy beans is conquered the use of that material as a protein source for products intended for human consumption is severely restricted.

One of the more interesting approaches in the preparation of a synthetic bacon product is described in *Food Engineering*, Volume 49, No. 3, pages EF-8 to EF-10 (1977). The synthetic bacon product described in the foregoing article is formed from the ends and pieces of bacon. While this product would appear to overcome the taste difficulties involved in using soy protein, it must be remembered that the source material for the product described in the article is dependent upon the supply of real bacon.

An inexpensive source of natural meat for use in simulated products is poultry such as chicken or turkey. U.S. Pat. No. 3,917,860 issued to Ayres Nov. 4, 1975 describes the use of such poultry products including turkey to formulate a simulated ground beef product. The extraction of poultry protein by saline solution for use in preparing a compacted meat is described in British Pat. No. 1,452,434 dated Oct. 13, 1976.

The poultry meats have not widely been explored for use in bacon products largely due to the dry non-fatty character of the meat. That is, turkey meat is first not easy to process after cooking due to the fact that it is quite dry, and second, when attempting to make a bacon product the low fat content (approximately 13%) differs greatly from the high fat content (70%) associated with real bacon.

The present invention therefore describes a fabricated bacon product substantially comprising real meat, particularily turkey, having the texture, chewability, and taste of high quality bacon.

Throughout the specification and claims percentages and ratios are by weight and temperatures are in degrees celsius unless otherwise indicated.

SUMMARY OF THE INVENTION

A process is described for preparing a partially cooked fabricated bacon including the steps of:

(a) preparing a lean portion for the fabricated bacon comprising:
  (1) from about 50% to about 97% by weight comminuted meat,
  (2) from about 3% to about 30% by weight binder; and,
  (3) from about 0% to about 30% by weight added water;

wherein the amount of fat in the lean portion is from about 5% to about 50% by weight; and, (b) preparing a white portion for the fabricated bacon comprising:
  (1) from about 75% to about 95% by weight comminuted meat;
  (2) from about 0.5% to about 15% by weight salt; and,
  (3) from about 3% to about 30% by weight added water;

wherein the amount of fat in the white portion is from about 1% to about 20% by weight;

(c) forming the lean portion and the white portion into a loaf having at least one distinctive lean area and at least one distinctive white area; and, (d) cooking the loaf under controlled humidity conditions such that the interior temperature of the loaf is at least 45° C. but less than 77° C., to obtain the partially cooked fabricated bacon.

DETAILED DESCRIPTION OF THE INVENTION

The first aspect of the present invention to be discussed is that of the meat used to form the fabricated bacon product. The meats which may be used to form both the lean portion and white portion of the fabricated bacon are comminuted (ground up) meats. Meat as used herein includes all manner of animal protein. Preferably, the meat is selected from the group consisting of meat, poultry and fish and in particular turkey, chicken, duck, goose, beef, cod, pollock, mutton, veal, and pork and mixtures thereof. In one aspect of the invention comminuted turkey meat is used in the white portion and beef is used in the lean portion. The foregoing combination in addition to providing excellent taste also minimizes the amount of artificial coloring which is necessary to approximate the lean (red) and white (fatty) portions of the fabricated bacon product. It is noted that the lean and white portions will, during processing, change color slightly and thus absolute colors are not a limitation in the present invention.

A most preferred aspect of the present invention is to use comminuted turkey meat in both the lean and white portions of the fabricated bacon product. The use of turkey meat for both portions of the fabricated bacon product is particularily desirable in that the overall fat content of the product can be reduced by as much as 80% when compared to real bacon. Moreover, the use of turkey for both the white portion and the lean portion allows greater flexibility in storage and handling of the meat component.

The lean portion of the fabricated bacon product comprises from about 50% to 97%, preferably from about 60% to about 90% by weight of the comminuted meat. The white portion of the fabricated bacon contains from about 60% to about 95%, preferably from about 70% to about 90% by weight of the comminuted meat.

The amount of fat in the lean portion of the fabricated bacon is from about 5% to 50%, preferably from about 10% to about 35% by weight. In the white portion of the fabricated bacon the amount of fat present in the meat is from about 1% to about 20%, preferably from about 4% to about 18% by weight. It is readily apparent in contrast to real bacon, that the white portion of the fabricted bacon contains considerably less fat. This distinction is not only important in lowering the overall fat content of the fabricated bacon but is also significant in preparing the fabricated bacon such that it has the texture and crinkliness of real bacon.

It has been discovered that if the fat content of the lean portion is at least equal to, and preferably greater than the fat content of the white portion that the product will when cooked and then dried puff in the white portion while shrinking in the lean portion, such that the texture and crinkliness approximate that of real fried bacon. It is therefore desirable, that the ratio of the fat content of the white portion to that of the lean portion should be from about 1:1 to about 1:3.

The preferred source of turkey meat is that obtained by deboning turkey carcasses. Of course, whole white turkey meat may be used in the present invention for the lean and white portion but is not favored due to its higher cost. Turkey gizzards and hearts may also be used in addition to the turkey white meat in preparing the fabricated bacon.

In preparing the fabricated bacon product of the present invention it is desirable that the ratio of the lean portion to the white portion should be from about 2:1 to about 1:2, preferably from about 3:2 to about 2:3 and most preferably about 1:1.

A second important consideration in the processing aspect of the present invention is the inclusion of added water in forming the fabricated bacon product. The water content when strictly controlled in the lean portion and the white portion assists in forming the crinkled structure of the bacon upon frying. The amount of added water in the lean portion is preferably from about 5% to about 25% by weight thereof. Where no added water is used, the lean portion slices poorly following cooking and is very fragile with high cooking loss due to removal of the bound water in the meat. Above the 30% upper limit the lean portion undergoes expansion and brittleness to an unacceptable degree such that the crinkly nature of the product is lost upon frying.

The water content of the white portion of the fabricated bacon should be from about 3% to about 30%, preferably from about 6% to about 20% by weight. The water content of the white portion within the foregoing ranges assists in puffing the white portion which as previously noted is lower in fat content than the lean portion. That is, the present invention relies on the presence of added water in the white portion to make up for the reduced fat content. This discovery is of course important both economically and for reducing the amount of fat in the overall product.

The white portion of the fabricated bacon product also must contain salt at a level of from about 0.5% to about 15%, prefrably about 1% to about 10% by weight. The purpose of the salt in a real bacon product is to add flavor and to assist in curing the meat. However, in the present product, the salt is included with the white portion not only to flavor the entire fabricated bacon product but to act in concert with the water to solubilize the salt soluble proteins in the meat. The purpose for solubilizing the salt soluble proteins is to rearrange those proteins within the white portion during cooking to coagulate the product. That is, the solubilization of the salt soluble proteins gives the white portion a crisp texture not found in most bacon analogs due to the protein rearrangement within the white portion. The combination of the salt and water in the white portion thus reduces or eliminates the need for proteinaceous fillers or strands of synthetic protein commonly found in bacon substitutes.

The lean portion of the fabricated bacon product contains as an essential ingredient a binder at a level of from about 3% to about 30%, preferably from about 4% to about 10% by weight. Any suitable binder commonly used in making meat analogs or synthetic meats may be employed. The preferred binder is a protein source which is used to strengthen the lean portion of the product. In the absence of binders, the lean portion undergoes excessive fat and moisture loss in the loaf upon cooking. Examples of binders include protein isolates such as soy which has been precipitated at its isoelectric point, albumin (egg whites in particular), gluten such as Pro 80 Gluten ® sold by General Mills Chemicals, Inc. of Minneapolis, Minn., Promine FS available from Central Soya, or any of the acceptable food additive galactomannan gums such as guar gum also available from General Mills Chemicals, Inc. Preferably the binder is soy protein, egg whites, or gluten as well as mixtures thereof.

Other ingredients which may be included in the lean and white portions of the fabricated bacon product include food colors, smoke flavoring, maple flavoring, hickory flavoring and the like. Oils such as soy bean oil may be used as a processing and frying aid. Additional desirable ingredients are the meat phosphates such as sodium tripolyphosphate, sodium pyrophosphate, or sodium hexametaphosphate at a level of from about 0.1% to about 5% by weight of bacon substitute product.

The loaf of the bacon substitute product is formed most conveniently by extruding the white portion and the lean portion through a die. Alternatively, the loaf may consist of a single strip of the bacon substitute. The product may also be formed by layering the white and lean portions into a pan. In any event, the loaf is formed such that there is at least one distinctive white portion and one distinctive lean portion. The area adjacent to the distinct strips may be pink due to the running of food coloring in forming the loaf. Such a result is not at all undesirable in that bacon often is colored similarily.

While only two distinct portions are required, any number of alternating lean and white strips may be formed. It is also noted that a degree of random dispersion of white in lean and lean in white may be accomplished to further simulate real bacon.

The loaf is then cooked under conditions of controlled humidity, preferably using both dry air and steam until the loaf reaches an internal temperature of between 45° C. and 77° C., preferably about 50° C. to about 65° C. Within the foregoing range the protein in the white and lean portions congeals to strengthen the loaf. Moreover, the crinkly nature of real bacon will be obtained by cooking within the foregoing temperature limits when the product is subsequently fried. The cooking humidity is preferably controlled to a dry bulb temperature of from about 90° C. to about 180° C. and a wet bulb temperature of from about 80° C. to about 100° C.

Following the cooking operation, the bacon substitute product is ready for sale. Preferably, the product is subjected to two additional steps, however. The first step involves slicing the product into strips measuring in length from about 10 to about 30 cm, in width from about 1 to about 15 cm and in thickness from about 0.1 to 0.3 cm. Within the foregoing measurements the product is well suited for the second step, namely prefrying.

The cut strips are then fried in hot oil (about 160° C. to 220° C.) to reduce the moisture content and to shelf-stabilize the product. The moisture content of the prefried product should be from about 5% to about 55%. As noted above the dimensions of the individual strips are highly important in the prefrying. First, the frying proceeds more predictably, that is, less burning. Secondly, the strips crinkle like real bacon upon frying due in part to the shape (dimensions) of the strip.

After the prefrying operation the product is packaged for sale. A desirable variable is to fry the strips leaving only enough moisture to allow microwave cooking.

The following is an example of the present invention.

EXAMPLE I

A fabricated bacon product is prepared in the following manner having a white (fatty) and a lean portion.

The white portion is prepared by tempering comminuted turkey meat to minus 2° C. Alternatively, the comminuted turkey meat could be prepared from the frozen state by hydrauflaking into small pieces. The turkey meat is then mixed with the preblend of Table I and water at a temperature of 38° C. For convenience, the amount of each preblend in the white or lean portion is shown in Table V. If the hydrauflaked turkey meat is used the mixing is done in a heat jacketed mixer with water at a temperature of about 52° C. within the heat jacket. The ingredients are mixed until it comes to a temperature of about minus 0.5° C. Coloring solutions from preblends 3 and 4 as shown below and oil flavors are then added to and mixed with the turkey. The mixing is then continued for a period of about 5 minutes with only a slight temperature rise.

The white portion is then removed from the mixer and passed through a 1.2 mm plate of Griffith Mincemaster. As the product leaves the Mincemaster the exit temperature is in the range of about 1° C. to 5° C.

The lean portion of the fabricated bacon product is prepared as above by hydrauflaking or tempering comminuted turkey meat. A mixture of pork trimmings (about 50% fat), turkey gizzards and hearts is then ground through a 3 mm die. The pork trimmings, turkey hearts, turkey gizzards and the turkey white meat are then mixed in a heat jacketed mixer (52° C. water) until the temperature of the lean portion reaches about 5° C.

The mixture of turkey meat, hearts, gizzards and pork is then combined with the preblend of Table II, 70° C. water, the coloring solution of Table III, oil and flavoring and mixed for 6 minutes. Thereafter, a small amount of salt is added and mixing is continued for an additional 5 minutes at which time the exit temperature of the lean portion of the fabricated bacon is about 7° C.

At this point the fabricated bacon is prepared in a loaf by extruding equal parts of the white portion and the lean portion through a die. In this particular instance the white portion and the lean portion are each split into two streams such that the resulting loaf contains alternating lean (red) and white (fatty) portions. The loaf is extruded into a cooking pan such that the loaf size is approximately 60 centimeters by 20 centimeters by 2.5 centimeters. It is noted that it is within the scope of the invention to also extrude individual strips of bacon and also to form the loaf by manually placing alternating white and lean portions into the baking pan. It is further noted that the configuration of the die may be set such that spotting of the lean portion with the white or vice versa may be accomplished. In any event, the product will be extruded such that there are distinctive white and lean areas.

The loaf following extrusion is then cooked in an oven at a temperature of about 150° C. for 55 minutes to coagulate the protein. The internal temperature of the loaf during the cooking process reaches a maximum of about 55° C. The wet bulb and dry bulb settings to determine the humidity within the oven will ordinarily be 97° C. and 150° C. respectively. A suitable variation of the cooking operation is found in U.S. Pat. No. 3,999,474 herein incorporated by reference.

Following cooking the product is ready for sale to the consumers. It has, however, been found beneficial to conduct two additional steps in processing the fabricated bacon product. The first step is slicing the loaf into bacon strips having a length of 20.32 centimeters, a thickness of from about 0.159 centimeters and a width of from about 2.54 centimeters. The foregoing dimensions will aid in obtaining a crinkly bacon product upon conducting the second mentioned step, namely prefrying the product.

The prefrying itself is conducted by passing the sliced bacon strips through hot oil at a temperature of about 205° C. for a period of 0.3 minutes to reduce the moisture content to 23% by weight. The prefrying operation has the effect of improving shelf life and imparting a crinkly nature to the partially fried product. The prefrying also reduces the consumer frying time to from about 2 to about 4 minutes versus 10 to 15 minutes for real bacon.

Products prepared as in this example with prefrying are then packaged for sale to the consumer. The consumer then completes the frying operation by placing the fabricated bacon in a frying pan to which a small amount of oil has been added. The consumer then fries the fabricated bacon to completion in 2 to 4 minutes. In contrast to real bacon which contains large amounts of saturated fat, the present product may be fried in polyunsaturated oils (corn or safflower) for dietic purposes.

Listed below in Tables I through IV are the preblends used in preparing the fabricated bacon product. Table V below lists the composition of the lean and white portions of the loaf used to prepare the fabricated bacon product.

Table I

| Preblend 1 | Percent |
|---|---|
| Salt | 35.32 |
| Dextrose | 3.97 |
| Sodium Tripolyphosphate | 7.34 |
| Smoke Flavor (5% absorbed on salt) | 53.37 |

Table II

| Preblend 2 | Percent |
|---|---|
| Pro 80 Gluten ® (General Mills Chemicals Inc.) | 34.78 |
| Promine FS Central Soya - soy protein isoalte | 25.84 |
| Sugar | 18.44 |
| Bacon Flavor | 9.98 |
| Egg whites | 8.90 |
| Guar Gum (General Mills Chemicals, Inc.) | 1.24 |
| Monosodium Glutamate | .51 |
| Cerelose (dextrose) | .31 |

Table III

| Preblend 3 - coloring | Percent |
|---|---|
| Red No. 3 | 2.13 |
| Brown No. 22 B | 0.87 |
| Water | 97.00 |

Table IV

| Preblend 4 - coloring | Percent |
|---|---|
| Brown No. 22B | 0.25 |
| Water | 99.75 |

Table V

| Lean Portion | Percent |
|---|---|
| Comminuted (Deboned) Turkey | 49.674 |
| Pork | 15.460 |
| Turkey Hearts | 7.300 |
| Turkey Gizzards | 4.870 |
| Preblend 2 | 9.631 |
| Water | 5.450 |
| Swift Hilite - soy oil | 3.470 |
| Color Preblend 3 | 0.176 |
| Bacon, pork and maple flavoring | 1.402 |
| Salt | 2.567 |

| White Portion | Percent |
|---|---|
| Comminuted (Deboned) Turkey | 84.121 |
| Water | 8.410 |
| Preblend 1 | 6.539 |
| Color Preblend 4 | 0.099 |
| Color Preblend 3 | 0.011 |
| Bacon Flavor | 0.820 |

The product of the present invention as shown in the above example is an excellent tasting bacon product which simulates real bacon in frying characteristics but contains 80% less fat in the cooked state than real bacon. Similar products are prepared using cod, pollock, pork, duck, mutton, chicken, veal, or beef in place of the turkey with similar results.

What is claimed is:

1. A process for preparing a partially cooked fabricated bacon including the steps of:
    (a) preparing lean and white portions for the fabricated bacon by separately mixing combinations of ingredients therefore, said combinations respectively comprising
        (1) from about 50% to 97% by weight comminuted meat, from about 3% to about 30% by weight binder and from about 5% to about 30% by weight added water, and
        (2) from about 75% to about 95% by weight comminuted meat, from about 0.5% to about 15% by weight salt and from about 3% to about 30% by weight added water
    wherein the amount of fat in the lean portion (1) is from about 5% to about 50% by weight, the amount of fat in the white portion (2) is from about 1% to about 20% by weight and the ratio of the said fat contents is in the range of 3:1 to 1:1 and such that upon being fried in hot oil the lean portion will shrink whereas the white portion will puff, and
    wherein the mixing of the white portion is sufficient to effect solubilization of the meat protein in conjunction with the solubilizing action of the salt, such solubilizing also facilitating the forming of a crisp texture in the white portion when the same is fried in hot oil;
    (b) forming the lean portion and the white portion into a loaf having at least one distinctive lean area and at least one distinctive white area; and
    (c) cooking the loaf under controlled humidity conditions such that the interior temperature of the loaf is at least 45° C. but less than 77° C. to obtain the partially cooked fabricated bacon.

2. The process of claim 1 wherein the meat for the lean and white portions is selected from the group consisting of turkey, mutton, veal, chicken, duck, goose, beef, fish and pork, and mixtures thereof.

3. The process of claim 1 wherein the meat for the lean portion and the white portion is predominately turkey.

4. The process of claim 1 wherein the meat for the lean portion is predominately beef and the meat for the white portion is predominately turkey.

5. The process of claim 1 wherein the weight ratio of the lean portion to white portion is from about 2:1 to about 1:2.

6. The process of claim 1 wherein the loaf is sliced into individual strips following cooking.

7. The process of claim 6 wherein the sliced strips are partially fried.

8. The process of claim 7 wherein the individual slices have a length of from about 10 cm to about 30 cm, a thickness of from about 0.1 cm to about 0.3 cm and a width of about 1 cm to about 15 cm.

9. The process of claim 1 wherein the cooking is accomplished with steam and heated air having a wet bulb temperature of from about 80° C. to about 100° C. and a dry bulb temperature of from about 90° C. to about 180° C.

10. The process of claim 1 wherein the binder in the lean portion is selected from the group consisting of soy protein, egg whites, and gluten and mixtures thereof at a level of from about 4% to about 10% by weight of the lean portion.

11. The process of claim 1 wherein the loaf is formed by extrusion.

12. The process of claim 1 wherein the salt in the white portion is at from about 1% to about 10% by weight.

13. The product prepared by the process of claim 1.

14. The product prepared by the process of claim 6.

15. The product prepared by the process of claim 8.

16. A process for preparing a partially cooked and prefried fabricated bacon including the steps of:
  (a) preparing lean and white portions for the fabricated bacon by separately mixing combinations of ingredients therefore, said combinations respectively comprising
    (1) from about 50% to 97% by weight comminuted meat which is predominantly turkey, from about 3% to about 30% by weight binder and from about 5% to about 30% by weight added water, and
    (2) from about 75% to about 95% by weight comminuted meat which is predominantly turkey, from about 0.5% to about 15% by weight salt and from about 3% to about 30% by weight added water.
  wherein the amount of fat in the lean portion (1) is from about 5% to about 50% by weight, the amount of fat in the white portion (2) is from about 1% to about 20% by weight and the ratio of the said fat contents is in the range of 3:1 to 1:1 and such that upon being fried in hot oil the lean portion will shrink whereas the white portion will puff, and
  wherein the mixing of the white portion is sufficient to effect solubilization of the meat protein in conjunction with the solubilizing action of the salt, such solubilizing also facilitating the forming of a crisp texture in the white portion when the same is fried in hot oil;
  (b) forming the lean portion and the white portion into a loaf having at least one distinctive lean area and at least one distinctive white area;
  (c) cooking the loaf under controlled humidity conditions such that the interior temperature of the loaf is at least 45° C. but less than 77° C.;
  (d) slicing the partially cooked loaf into individual strips; and
  (e) frying the individual strips in hot oil to yield the partially cooked and prefried fabricated bacon.

17. The product prepared by the process of claim 16.

* * * * *

UNITED STATES PATENT AND TRADEMARK OFFICE
CERTIFICATE OF CORRECTION

PATENT NO. : 4,132,810
DATED : January 2, 1979
INVENTOR(S) : Richard K. Knutson

It is certified that error appears in the above-identified patent and that said Letters Patent are hereby corrected as shown below:

Column 1, line 8, Delete "back" and insert -- bacon -- line 29, After "June" delete "."

Column 3, line 39, Delete "dried" and insert -- fried --

Signed and Sealed this

*Third* Day of *April 1979*

[SEAL]

Attest:

RUTH C. MASON
*Attesting Officer*

DONALD W. BANNER
*Commissioner of Patents and Trademarks*